United States Patent
Ohana et al.

(10) Patent No.: US 9,548,836 B2
(45) Date of Patent: Jan. 17, 2017

(54) UPSTREAM BURST NOISE DETECTION

(71) Applicant: Broadcom Corporation, Irvine, CA (US)

(72) Inventors: Yitshak Ohana, Givat Zeev (IL); Avi Kliger, Ramat Gan (IL); Anatoli Shindler, Qiryat Ono (IL); Bazhong Shen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 32 days.

(21) Appl. No.: 14/137,345

(22) Filed: Dec. 20, 2013

(65) Prior Publication Data

US 2015/0146827 A1   May 28, 2015

Related U.S. Application Data

(60) Provisional application No. 61/909,051, filed on Nov. 26, 2013.

(51) Int. Cl.
  *H04B 15/00* (2006.01)
  *H04L 1/00* (2006.01)
  *H04L 1/20* (2006.01)

(52) U.S. Cl.
  CPC ........... *H04L 1/0054* (2013.01); *H04L 1/0047* (2013.01); *H04L 1/20* (2013.01); *H04L 1/0057* (2013.01)

(58) Field of Classification Search
  CPC ....... H04B 3/32; H04B 3/23; H04L 25/03343; H04L 25/497; H04L 25/03057
  USPC ................. 375/224–228, 257–296, 316–352
  See application file for complete search history.

(56) References Cited

U.S. PATENT DOCUMENTS

| | | | |
|---|---|---|---|
| 6,369,758 B1 * | 4/2002 | Zhang .................. | H04B 7/0851 342/378 |
| 9,118,444 B2 * | 8/2015 | Kliger .................... | H04L 5/0046 |
| 2001/0055319 A1 * | 12/2001 | Quigley .................. | H04L 1/203 370/480 |
| 2006/0141971 A1 * | 6/2006 | Howard ................ | H04L 1/0006 455/296 |
| 2006/0172716 A1 * | 8/2006 | Yoshii ................. | H04L 27/2647 455/226.1 |
| 2009/0264123 A1 * | 10/2009 | Agashe et al. ................ | 455/434 |
| 2010/0157786 A1 * | 6/2010 | Akita ...................... | H04L 5/023 370/210 |
| 2010/0191525 A1 * | 7/2010 | Rabenko ................... | H04B 3/23 704/211 |
| 2010/0251064 A1 * | 9/2010 | Shen .................... | H03M 13/033 714/752 |
| 2011/0096684 A1 * | 4/2011 | Liao ..................... | H04L 12/2801 370/252 |
| 2011/0243268 A1 * | 10/2011 | Mashino .............. | H04J 11/0066 375/285 |

(Continued)

*Primary Examiner* — James M Perez
(74) *Attorney, Agent, or Firm* — Sterne, Kessler, Goldstein & Fox P.L.L.C.

(57) ABSTRACT

The present disclosure is directed to a system and method for detecting burst noise. The system and method are described in the exemplary context of a cable modem system and can be used in such a system to specifically detect upstream burst noise. Once detected, the system and method can adjust the upstream receiver that receives data corrupted by the upstream burst noise to reduce the potentially deleterious effects that the burst noise can have on, for example, the packet error rate and/or data rate of the upstream receiver.

20 Claims, 7 Drawing Sheets

(56) References Cited

U.S. PATENT DOCUMENTS

| | | | |
|---|---|---|---|
| 2012/0243527 A1* | 9/2012 | Currivan | H04L 1/004 370/345 |
| 2013/0044028 A1* | 2/2013 | Lea | H01Q 21/24 342/359 |
| 2013/0121441 A1* | 5/2013 | Murakami | H04L 1/007 375/296 |
| 2013/0170535 A1* | 7/2013 | Atungsiri | H04L 27/3488 375/229 |
| 2014/0022125 A1* | 1/2014 | Zhu et al. | 342/377 |
| 2014/0201592 A1* | 7/2014 | Shen | H04L 1/0041 714/758 |
| 2014/0282783 A1* | 9/2014 | Totten | H04L 12/2885 725/111 |
| 2014/0357194 A1* | 12/2014 | Jin | H04W 8/005 455/41.2 |
| 2015/0229416 A1* | 8/2015 | Williams | H04W 24/08 370/252 |

* cited by examiner

UPSTREAM BURST NOISE DETECTION

CROSS REFERENCE TO RELATED APPLICATIONS

This application claims the benefit of U.S. Provisional Patent Application No. 61/909,051, filed Nov. 26, 2013, which is incorporated by reference herein.

TECHNICAL FIELD

This application relates generally to burst noise detection, including upstream burst noise detection.

BACKGROUND

In a communication system, a transmitter transmits data to a receiver over a communication medium in the presence of noise. The noise alters the data and, if the alteration is severe enough, the receiver may be unable to recover the data as originally transmitted. Two major types of noise that are common to communication systems include Additive White Gaussian Noise (AWGN) and burst noise.

AWGN is characterized by the fact that it is stationary in time and contains equal power within any frequency band with a fixed width. Because of these attributes, the energy level of AWGN can be predicted fairly accurately and used to tune parameters of a receiver to compensate for its corruptive effects to a signal received by the receiver. Burst noise, on the other hand, may be non-stationary in time and typically lasts only for a short period of time (e.g., less than 100 microseconds). During the short period of time that it typically occurs, burst noise may be significantly stronger than AWGN. The non-stationary nature and strong noise level of burst noise during short periods of time make it difficult to tune parameters of a receiver to compensate for its corruptive effects to a signal received by the receiver. However, in order to provide a required performance level in terms of, for example, data rate and packet error ratio, a receiver may need to detect burst noise so that errors in the data it receives that are caused by burst noise can be corrected.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
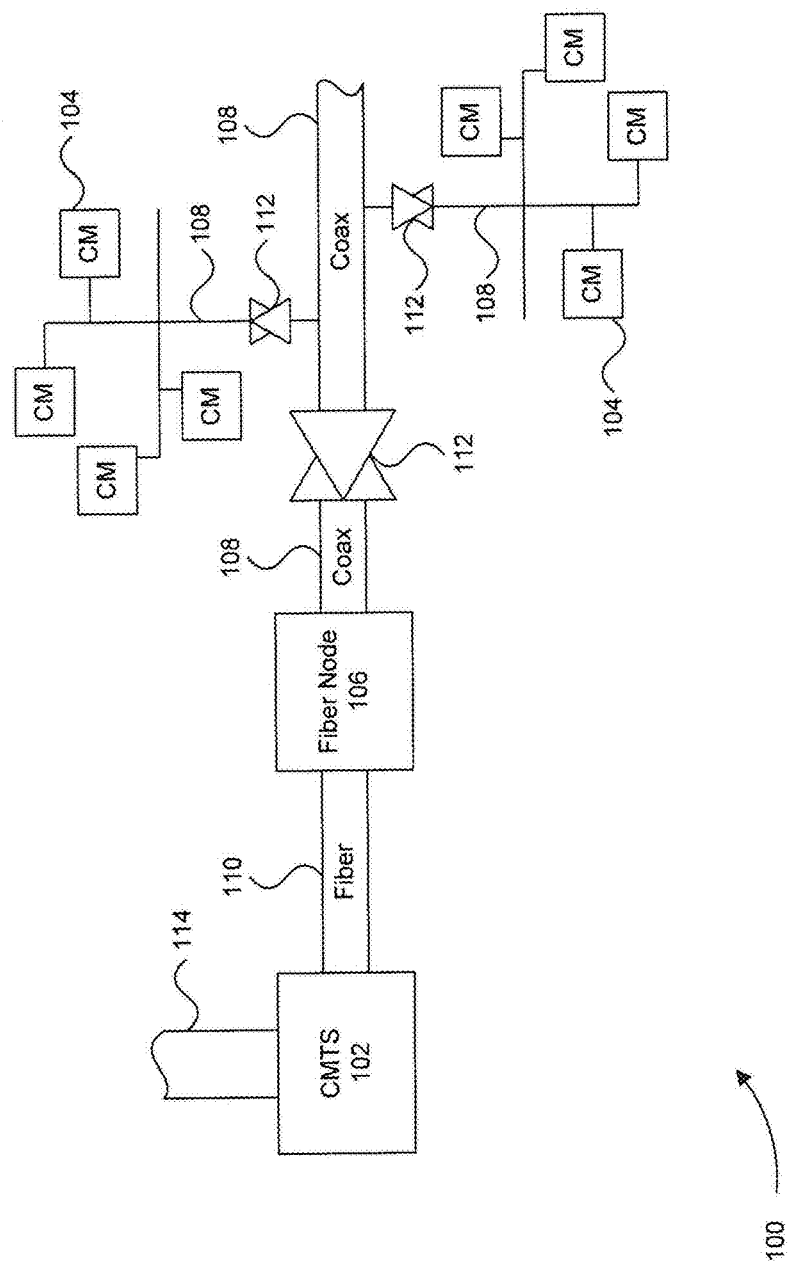
FIG. 1 illustrates an exemplary cable modem system.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

I. Overview

The present disclosure is directed to a system and method for detecting burst noise. The system and method are described below in the exemplary context of a cable modem system and can be used in such a system to specifically detect upstream burst noise. Once detected, the system and method can adjust the upstream receiver that receives data corrupted by the upstream burst noise to reduce the potentially deleterious effects that the burst noise can have on, for example, the packet error rate and/or data rate of the upstream receiver. These and other features of the present disclosure are described further below.

II. Exemplary Cable Modem System and Cable Modem Termination System

In an exemplary cable modem system in which embodiments of the present disclosure can be implemented, a cable modem termination system is located at a cable operator's facility and functions to serve a large number of subscribers. Each subscriber has a cable modem and the cable modem termination system is capable of communicating bi-directionally with the cable modems. A typical cable modem termination system includes a burst receiver, a continuous transmitter, a medium access control (MAC), and upper layer functionalities.

The cable modem termination system can communicate with the cable modems via a hybrid fiber coaxial (HFC) network. The HFC network utilizes a point-to-multipoint topology to facilitate communication between the cable modem termination system and the cable modems. Frequency domain multiplexing (FDM) combined with time division multiplexing (TDM) may be used to facilitate communication from the cable modem termination system to the cable modems, i.e., in the downstream direction. FDM can be accomplished using orthogonal sub-carriers, as in orthogonal frequency division multiplexing (OFDM), and/or using non-orthogonal sub-carriers with adequate spacing in the frequency domain. Frequency domain multiple access (FDMA) combined with time domain multiple access (TDMA) is used to facilitate communication from the cable modems to the cable modem termination system, i.e., in the upstream direction. FDMA can similarly be accomplished using orthogonal sub-carriers, as in orthogonal frequency division multiple access (OFDMA), and/or using non-orthogonal sub-carriers with adequate spacing in the frequency domain.

The cable modem termination system includes a downstream modulator for facilitating the transmission of data communications to the cable modems and an upstream demodulator for facilitating the reception of data communications from the cable modems. The downstream modulator of the cable modem termination system can use, for example, 64 QAM all the way up to 4096 QAM in an approximate frequency range of 250 MHz to 1.2 GHz to provide a data rate up to and beyond 10 Gbps. The upstream demodulator can use, for example, 64 QAM all the way up to 4096 QAM in an approximate frequency range of 5 MHz to 200 MHz to provide a data rate up to and beyond 2 Gbps. Similarly, each cable modem includes an upstream modulator for facilitating the transmission of data to the cable modem termination system and a downstream demodulator for receiving data from the cable modem termination system.

In order to accomplish TDMA or OFDMA for upstream communication, time slots or time and frequency slots (also referred to as minislots) may be assigned to each cable modem having a message to send to the cable modem termination system. The assignment of such minislots can be accomplished by providing a request contention area in the upstream data path within which the cable modems are permitted to contend in order to place a message to request time in the upstream data path for the transmission of their messages. The cable modem termination system responds to these requests by assigning minislots to the cable modems so that the cable modems can transmit their messages to the cable modem termination system utilizing TDMA and/or OFDMA and so that the transmissions are performed without undesirable collisions.

Referring now to FIG. 1, an exemplary cable modem system 100 that provides for the transmission of data between a cable modem termination system (CMTS) 102 and a number of cable modems (CMs) 104 using a HFC network as described above is shown. HFC networks are commonly utilized by cable providers to provide Internet access, cable television, voice services and the like to the subscribers associated with cable modems 104.

As shown in FIG. 1, cable modems 104 are in electrical communication with a fiber node 106 via coaxial cables 108. Amplifiers 112 can be used to facilitate the electrical connection of, for example, the more distant cable modems 104 to the fiber node 106 by boosting their electrical signals to enhance the signal-to-noise ratio of such communications. Fiber node 106 is further in communication with cable modem termination system 102 via optical fiber 110 and can perform the necessary electrical to optical and optical to electrical conversions between coaxial cables 108 and optical fiber 110 to facilitate the transfer of data. Cable modem termination system 102 communicates via transmission line 114 with the Internet, one or more headends, and/or any other desired device(s) or network(s) to provide various services to the subscribes associated with cable modems 104.

Figure 2:
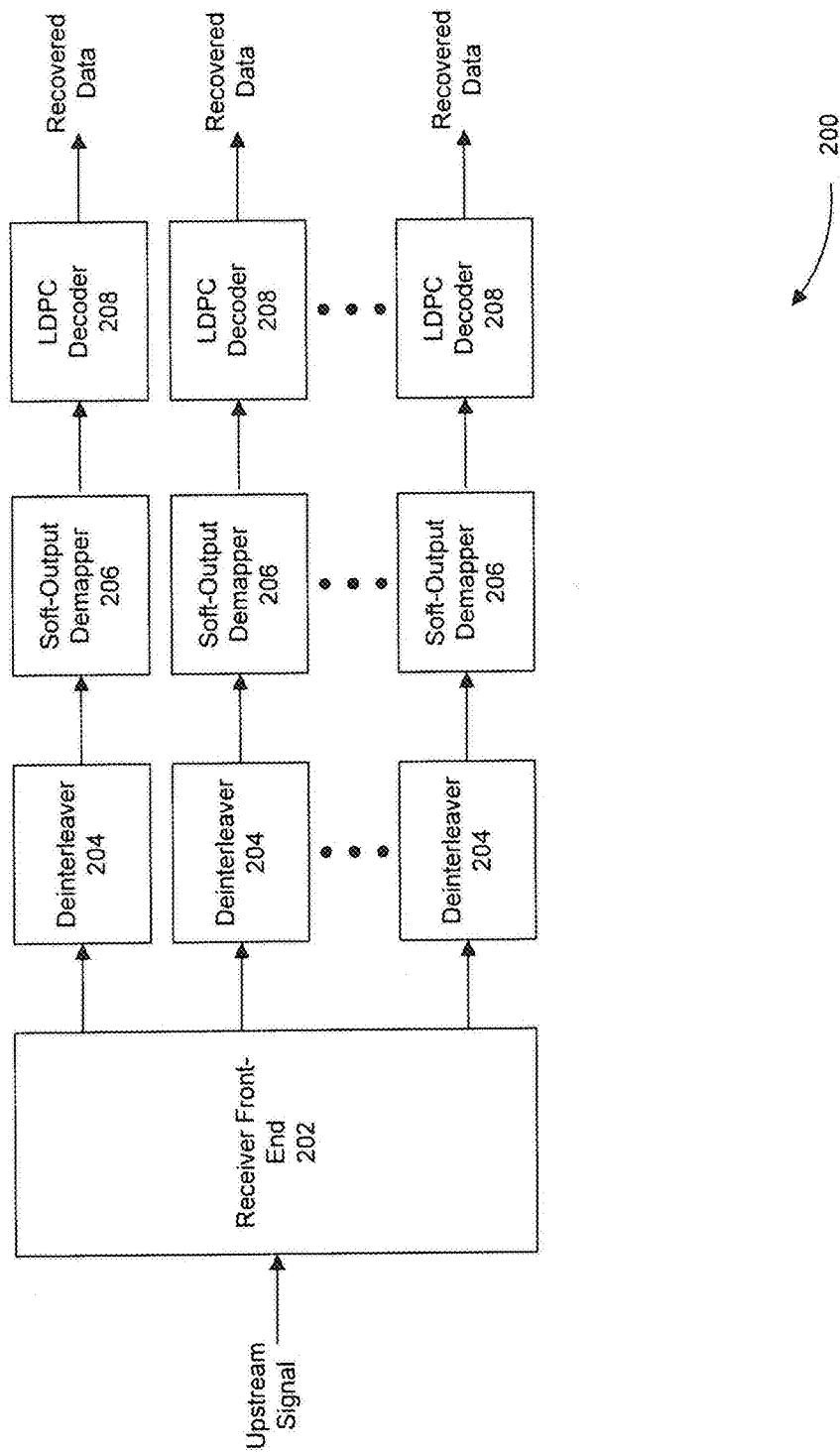
FIG. 2 illustrates exemplary, high-level blocks of an upstream receiver of a cable modem termination system.

Referring now to FIG. 2, an exemplary high-level block diagram of an upstream receiver 200 that can be implemented in a cable modem termination system, such as cable modem termination system 102 shown in FIG. 1, is illustrated. Upstream receiver 200 includes a receiver front-end 202, deinterleavers 204, soft-output demappers 206, and low-density parity-check (LDPC) decoders 208. It should be noted that the block diagram of upstream receiver 200 is provided for illustrative purposes only and is not meant to be limiting. Other upstream receivers with different configurations and/or components can incorporate embodiments of the present disclosure as would be appreciated by one of ordinary skill in the art based on the teachings herein.

In operation, upstream receiver 200 is configured to receive a signal containing the upstream transmissions from cable modems. The upstream transmissions can be performed in accordance with a combined FDMA/TDMA approach. The combined FDMA/TDMA approach allocates upstream transmission opportunities to the cable modems in both frequency and time such that the transmission opportunities for each cable modem do not overlap in frequency and time. For example, a first cable modem can be allocated an upstream transmission opportunity in a first specific time slot and in a first particular frequency band, and a second cable modem can be allocated an upstream transmission opportunity in at least one of a different time slot or frequency band than the first cable modem. A specific time/frequency slot can be referred to as a minislot. FDMA can be accomplished using orthogonal sub-carriers, as in orthogonal frequency division multiple access (OFDMA), and/or using non-orthogonal sub-carriers with adequate spacing in the frequency domain. Each cable modem can be allocated one or more sub-carriers during a time slot to transmit upstream.

Receiver front-end 202 can be used to filter, amplify, and down-convert the received upstream signal to provide baseband signals as output. Each of the baseband signals corresponds, for example, to a different sub-carrier over which a cable modem may have transmitted upstream data over. The upstream data can be formatted in accordance with any one of a number of different modulation techniques. In one embodiment, the cable modems transmit data over the subcarriers using QAM with a modulation order between 64 and 4096, for example. Assuming QAM was used, QAM symbols form the baseband signals output by receiver front-end 202.

Each deinterleaver 204 is configured to take some number of QAM symbols output by receiver front-end 202 and undo a re-arrangement of the order of the QAM symbols performed by an interleaver at the transmitter of the cable modem from which the QAM symbols were transmitted. Interleaving is typically used at transmitters to improve the performance of forward error correcting codes. More specifically, errors in transmitted data can occur in bursts due to, for example, burst noise. If the number of errors in a single code word exceeds the correction capability of the forward error correction code used, the receiver will be unable to recover the original code word. Interleaving can reduce the effects of burst errors by rearranging symbols (and their corresponding bits) across several code words before they are transmitted so that the errors in the symbols that occur as a result of a burst error will be spread out among multiple code words. In other embodiments of upstream receiver 200, deinterleavers 204 may not be used.

Each soft-output demapper 206 is configured to implement, for example, a log-likelihood ratio (LLR) algorithm to convert the QAM symbols of a respective one of the baseband signals output by receiver front-end 202 (and potentially deinterleaved by a deinterleaver 204) from their complex in-phase (I) and quadrature-phase (Q) forms to a stream of soft values. Each soft-output demapper 206 does this by estimating probability of which QAM symbol in the ideal QAM constellation was transmitted given the received I/Q sample. This could be done by finding the distances of the received I/Q sample to QAM symbols in the complex plane and, after making such a estimations, identifying the series of bits that are represented by these distances to the QAM symbols. From there, each soft-output demapper 206 assigns to each bit in the series of bits a level of confidence in the format of a LLR (or some other soft value). The LLR assigned to a bit represents a current belief that the demodulated bit is a logical "0" or a logical "1". Any one of a number of known methods for assigning these LLR values to the demodulated bits based on the position in the complex plane of the received QAM symbol can be used by soft-output demappers 206 as would be appreciated by one of ordinary skill in the art.

After soft-output demappers 206 output the LLR values, the LLR values are passed to a forward error correction decoder. In the example upstream receiver 200 shown in FIG. 2, the forward error correction decoders used are LDPC decoders 208. However, it should be noted that alternative or additional forward error correction schemes can be implemented by upstream receiver 200 that require different decoders than LDPC decoders 208.

In general, LDPC codes are a class of linear block codes. One of the most common algorithms used by LDPC decoders, such as LDPC decoders 208, to decode LDPC codes is the belief propagation algorithm, which is a form of soft-decision decoding. At a very high-level, the belief propagation algorithm and its variants involve passing the LLRs received from soft-output demappers 206 that belong to a codeword back and forth between check nodes and variable nodes. As the LLRs are passed back and forth, they are updated to ideally better reflect the actual bits of the code word that were transmitted. This passing generally continues until some maximum number of iterations has occurred or a parity check has been fulfilled. At that point, the current LLRs corresponding to each bit of the code word processed by the LDPC decoder 208 are converted into either a logical "0" or a logical "1" and output by the LDPC decoder 208 as recovered data that has potentially been corrected for errors that may have occurred during transmission.

Figure 3:
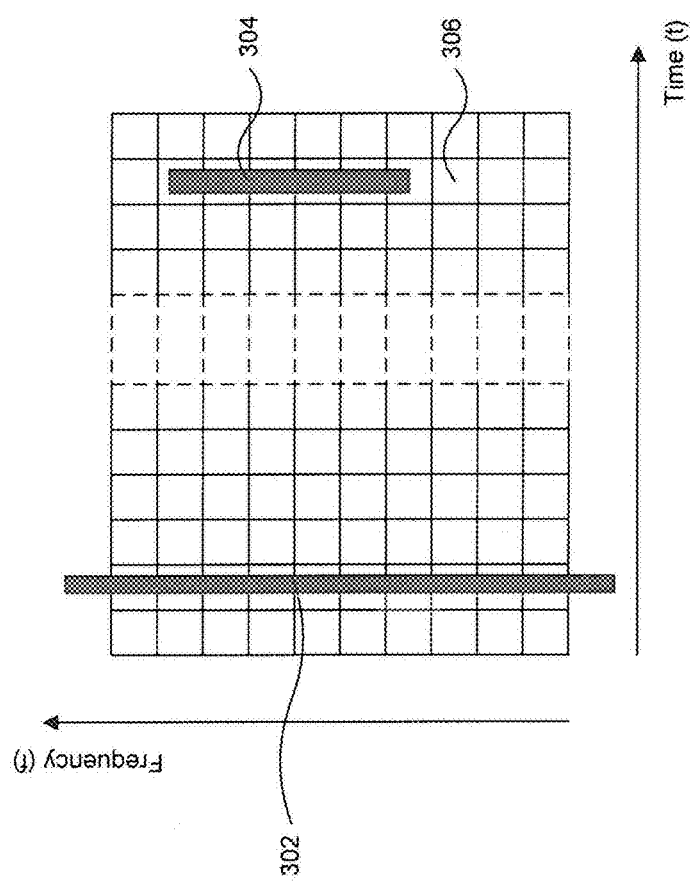
FIG. 3 illustrates a time versus frequency plot and two example instances of burst noise.

Such transmission errors may have occurred, for example, due to burst noise. Burst noise is non-stationary in time and typically occurs randomly, lasting only for a short period of time (e.g., less than 100 microseconds). The random occurrence and short duration of burst noise makes it difficult to not only reduce its effects on transmitted data, but also to even detect. For example, FIG. 3 illustrates two example instances of burst noise: wideband burst noise 302 and narrowband burst noise 304. The two example instances of burst noise 302 and 304 are shown as corrupting a number of upstream resource elements 306 that are plotted in a time versus frequency plot. Each resource element 306 corresponds, for example, to one upstream sub-carrier over one upstream QAM symbol period. As shown, wideband burst noise 302 corrupts a vertical column of upstream symbols that spans a large number of upstream sub-carriers, and narrowband burst noise 304 corrupts a vertical column of upstream symbols over a comparatively smaller number of upstream sub-carriers.

Although the use of forward error correction decoders can help to reduce errors caused by burst noise, such as burst noise 302 and 304, forward error correction decoders can perform better if they know which received symbols and corresponding LLRs were corrupted by burst noise. The present disclosure is directed to a system and method for detecting burst noise and estimating its strength. The system and method can be implemented in an upstream receiver, such as upstream receiver 200, to specifically detect upstream burst noise. Once detected, the system and method can adjust the upstream receiver that receives data corrupted by the upstream burst noise to reduce the potentially deleterious effects that the burst noise can have on, for example, the packet error rate and/or data rate of the upstream receiver. These and other features of the present disclosure are described in the following section.

It should be noted that upstream receiver 200 can be implemented in devices other than a cable modem termination system. For example, upstream receiver 200 can be implemented in an optical line terminal (OLT) operating in an Ethernet Passive Optical Network over Coax (EPoC). OLTs are used in such networks to communicate with Coax Network Units (CNUs) at customer premises.

III. System and Method for Burst Noise Detection

Figure 4:
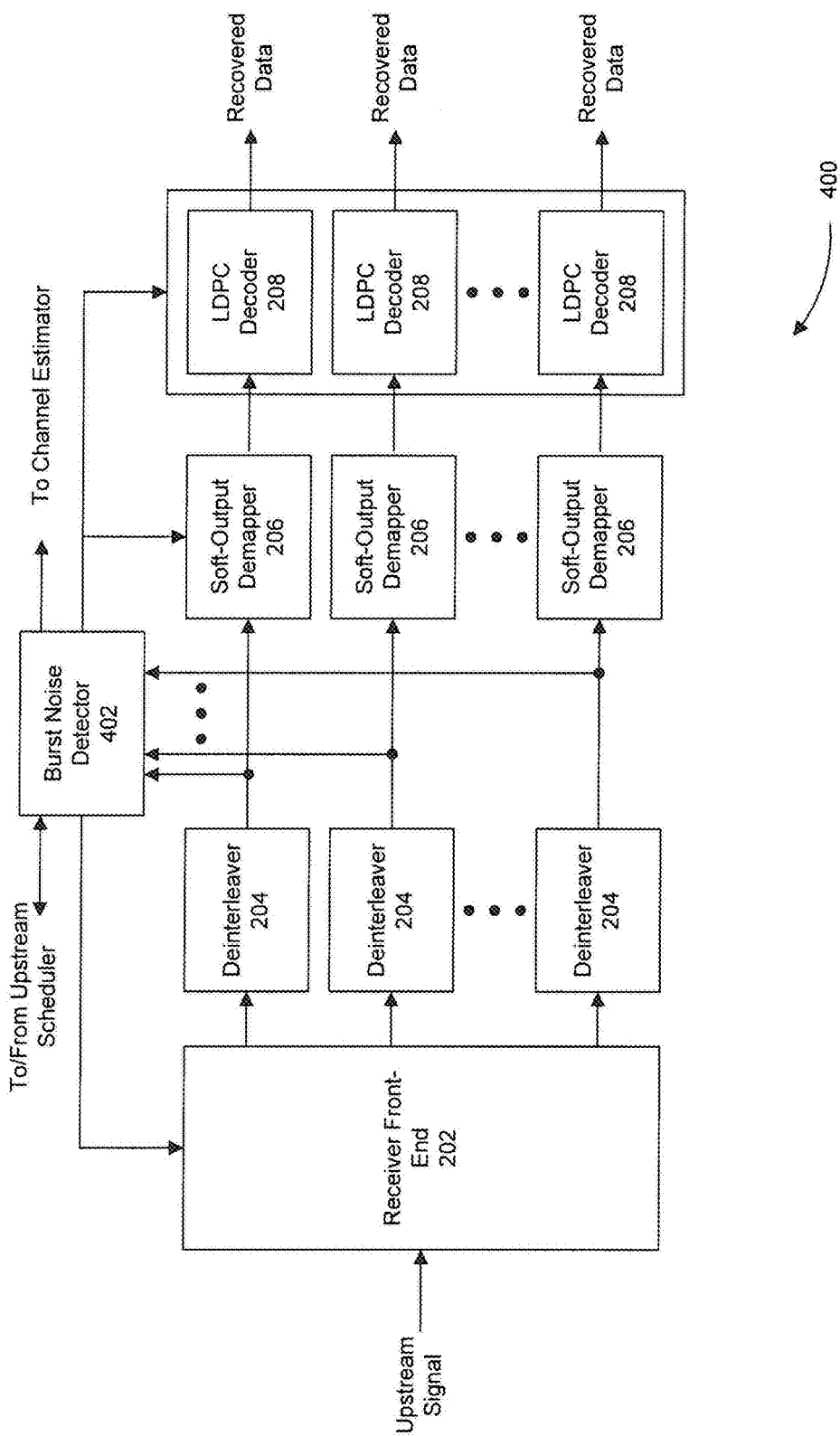
FIG. 4 illustrates an exemplary high-level block diagram of an upstream receiver that can be implemented in a cable modem termination system in accordance with embodiments of the present disclosure.

Referring now to FIG. 4, an exemplary high-level block diagram of an upstream receiver 400 that can be implemented in a cable modem termination system, such as cable modem termination system 102 shown in FIG. 1, is illustrated in accordance with embodiments of the present disclosure. Similar to upstream receiver 200 described above, upstream receiver 400 includes an receiver front-end 202, deinterleavers 204, soft-output demappers 206, and low-density parity-check (LDPC) decoders 208. These components may operate in the same or similar manner as described above in regard to upstream receiver 200. In addition to these components, upstream receiver 400 further includes a burst noise detector 402. It should be noted that the block diagram of upstream receiver 400 is provided for illustrative purposes only and is not meant to be limiting. Other upstream receivers with different configurations and/or components can incorporate burst noise detector 402 as would be appreciated by one of ordinary skill in the art based on the teachings herein.

In operation, burst noise detector 402 is configured to detect upstream burst noise and to estimate its strength in an upstream signal received by upstream receiver 400 and adjust upstream receiver 400 to reduce the potentially deleterious effects that the burst noise can have on, for example, the packet error rate and/or data rate of upstream receiver 400. In one embodiment, burst noise detector 402 detects upstream burst noise in the received upstream signal by analyzing one or more of the baseband signals output by receiver front-end 202. Although burst noise detector 402 is shown in FIG. 4 as analyzing one or more baseband signals output by receiver front-end 202 after they have been processed by deinterleavers 204, it should be noted that burst noise detector 402 can alternatively analyze the one or more baseband signals output by receiver front-end 202 before they are processed by deinterleavers 204. The baseband signals correspond, for example, to different sub-carriers of the received upstream signal over which cable modems may transmit data over.

In one embodiment, burst noise detector 402 specifically determines which of the baseband signals output by receiver front-end 202 correspond to nulled ones of the available sub-carriers in the upstream direction and processes those baseband signals to detect upstream burst noise. The term nulled is used in this context to denote those sub-carriers in the upstream direction where no cable modem transmits (e.g., the input values in the inverse Fast Fourier Transform of the upstream OFDMA modulator corresponding to the Nulled sub-carriers are zero), or is permitted to transmit, data over a given period of time. In version 3.1 of the Data Over Cable Service Interface Specification (DOCSIS) or in the EPoC standards, these nulled sub-carriers may be treated by the transmitters as excluded sub-carriers.

Figure 5:
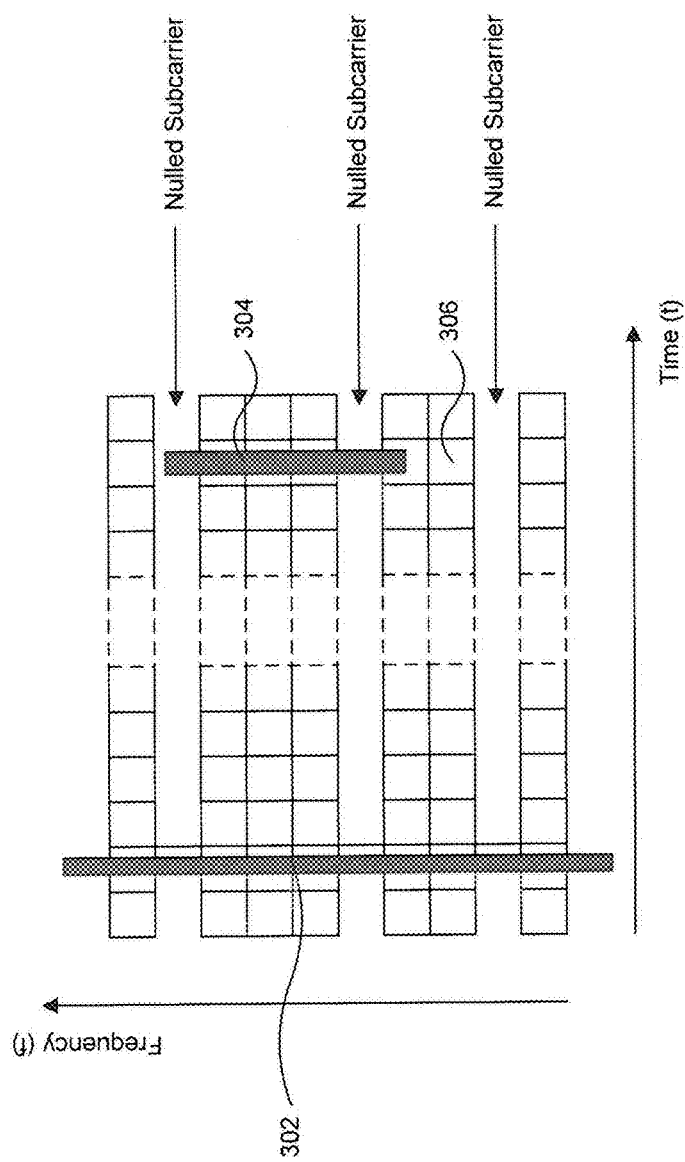
FIG. 5 illustrates a time versus frequency plot with a number of upstream resource elements with selected nulled sub-carriers in accordance with embodiments of the present disclosure.

FIG. 5 illustrates this concept of nulled sub-carriers through a modified version of the time versus frequency plot shown in FIG. 3. In particular, the time versus frequency plot of FIG. 3 is shown in FIG. 5 with a number of upstream resource elements 306 for select sub-carriers nulled, which again means that no cable modem transmits upstream over those select sub-carriers over a given period of time or symbol durations. Because no cable modem transmits upstream over those select sub-carriers, any energy received over those sub-carriers during the time they are nulled can be considered to be caused by AWGN and, potentially, burst noise. Burst noise detector 402 can use known techniques to estimate and remove the energy contribution of AWGN to reveal any energy contribution from a burst noise event. For example, burst noise detector 402 can process the three nulled sub-carriers shown in the plot of FIG. 5 to detect burst noise 302 and burst noise 304 and estimate the duration in time and the band of sub-carriers over which each occurs. This info can then, in turn, be used to determine which LLRs recovered from symbols received over the upstream signal may have been corrupted by burst noise or by AWGN and the estimated energy of this noise.

For example, to determine the band of sub-carriers over which a burst noise event occurs, burst noise detector 402 can assume, if burst noise has been detected at the same symbol period in two nulled sub-carriers that are spaced closest to each other in the frequency domain, that the burst noise corrupted all sub-carriers between those two nulled sub-carriers at the same symbol period. On the other hand, if no burst noise event is detected at the same symbol period in two nulled sub-carriers that are spaced closest to each other in the frequency domain, burst noise detector 402 can assume that the sub-carriers between those two nulled sub-carriers at the same symbol period are not corrupted by burst noise.

In one embodiment, upstream receiver 400 is used in a cable modem system that operates in accordance with DOCSIS 3.1. In this context, one nulled sub-carrier can be provided every 12 to 20 minislots, for example, with each minislot including either 8 or 16 sub-carriers. This range of spacing provides a good balance between the amount of resources used to detect burst noise and the resolution at which burst noise can be detected in frequency. To avoid non-detection of burst noise that is spaced evenly in the frequency domain (between nulled sub-carriers), the nulled sub-carriers can be spaced non-uniformly in the frequency domain.

In another embodiment, burst noise detector 402 is specifically configured to control an upstream scheduler at the cable modem termination system it is implemented within to prevent upstream transmissions from cable modems over certain sub-carriers and at certain times to create nulled sub-carriers. Alternatively or additionally, burst noise detector 402 can receive a signal from the upstream scheduler that provides an indication as to which sub-carriers over a given period of time correspond to nulled sub-carriers. Burst noise detector 402 can use this information received from the upstream scheduler 402 to analyze at appropriate times those baseband signals provided as output by receiver front-end 202 that correspond to nulled sub-carriers to detect upstream burst noise.

As noted above, once burst noise detector 402 detects the presence of burst noise, burst noise detector 402 can adjust upstream receiver 400 to reduce the potentially deleterious effects that burst noise can have on, for example, the packet error rate and/or data rate of upstream receiver 400. In one embodiment, burst noise detector 402 is configured to adjust the LLRs used by LDPC decoders 208. As noted above, LDPC decoders 208 associate with the bits recovered from the received upstream signal LLRs. The LLR associated with a bit generally represents the belief that the bit recovered from the received upstream signal is a logical one or a logical zero. Burst noise detector 402 can adjust the LLR associated with a bit determined to be corrupted by burst noise so that the one of the LDPC decoders 208 that uses the LLR to decode a codeword is more likely to decode the codeword correctly.

For example, if the bit determined to be corrupted by burst noise is received as a logical one, the LLR that gives the belief that the bit is, in fact, a logical one can be decreased because of the likely corruption of the received bit from burst noise. The amount in which the LLR is decreased can be determined based on the strength of the burst noise detected by burst noise detector 402.

In another embodiment, burst noise detector 402 is configured to control or inform a channel estimator (not shown) in upstream receiver 400 to ignore or discard a pilot symbol received over the upstream signal that burst noise detector has determined to have been corrupted by burst noise. Pilot symbols can be transmitted upstream by a cable modem to allow upstream receiver 400 to, for example, estimate the upstream channel. Often, pilot symbols are known by the receiver to allow for channel estimation to occur.

In yet another embodiment, burst noise detector 402 is configured to control or inform the receiver front-end 202 to prevent a phase-offset correction to the clock used by the receiver front-end 202 to down-convert and/or sample one or more of the plurality of sub-carriers in the received upstream signal, based on information received over one or more of the plurality of sub-carriers effected by the burst noise.

It should be noted that upstream receiver 400 can be implemented in devices other than a cable modem termination system. For example, upstream receiver 400 can be implemented in an OLT operating in an EPoC.

Figure 6:
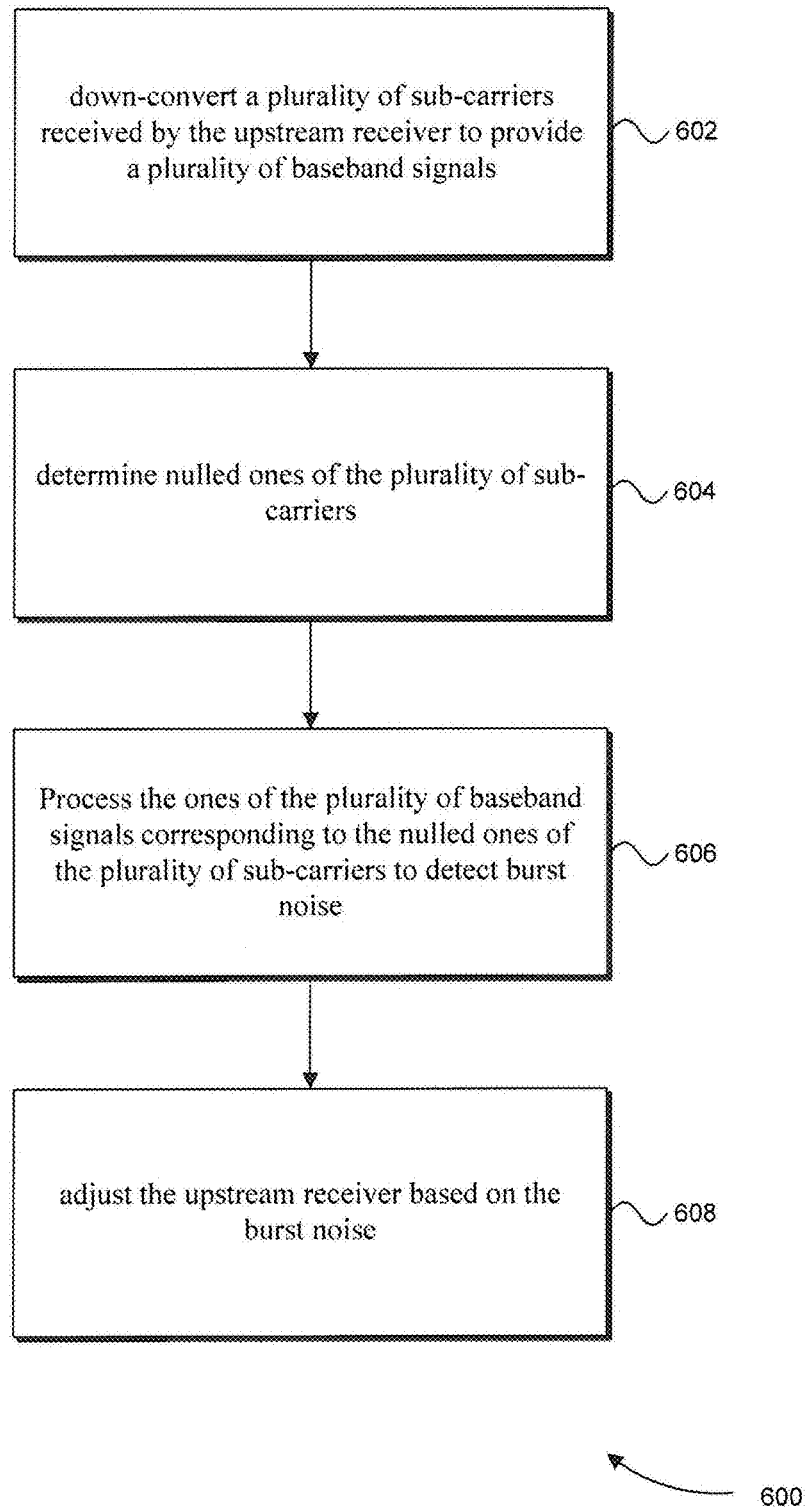
FIG. 6 illustrates a flowchart of an example method for detecting upstream burst noise at an upstream receiver in accordance with embodiments of the present disclosure.

Referring now to FIG. 6, a flowchart 600 of a method for detecting upstream burst noise at an upstream receiver is illustrated in accordance with embodiments of the present disclosure. The method of flowchart 600 is described below as being implemented by an upstream receiver, such as upstream receiver 400 described above in FIG. 4. However, it should be noted that the method can be implemented by other types of devices, including downstream receivers as would be appreciated by one of ordinary skill in the art based on the teachings herein.

The method of flowchart 600 begins at step 602. At step 602, a plurality of sub-carriers received by the upstream receiver is down-converted to provide a plurality of baseband signals as output. The plurality of sub-carriers can carry, for example, data transmitted upstream by cable modems.

At step 604, nulled ones of the plurality of sub-carriers are determined. As noted above, the term nulled is used in this context to denote those sub-carriers in the upstream direction where no device transmits, or is permitted to transmit, data over a given period of time.

At step 606, the ones of the plurality of baseband signals that correspond to the determined nulled ones of the plurality of sub-carriers are processed to detect burst noise. Because no device transmits upstream over those select sub-carriers, any energy received over those sub-carriers during the time they are nulled can be considered to be caused by AWGN and, potentially, burst noise. The energy contribution of AWGN can be estimated and removed from the baseband signals corresponding to the nulled ones of the plurality of sub-carriers to reveal any energy contribution from a burst noise event. This info can then, in turn, be used to determine which LLRs recovered from symbols received over the other sub-carriers may have been corrupted by AWGN and/or burst noise.

Finally, at step 608, the upstream receiver can be adjusted to reduce the potentially deleterious effects the detected burst noise can have on, for example, the packet error rate and/or data rate of upstream receiver. The upstream receiver can be adjusted, for example, using one or more of the techniques described above in regard to FIG. 4.

III. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
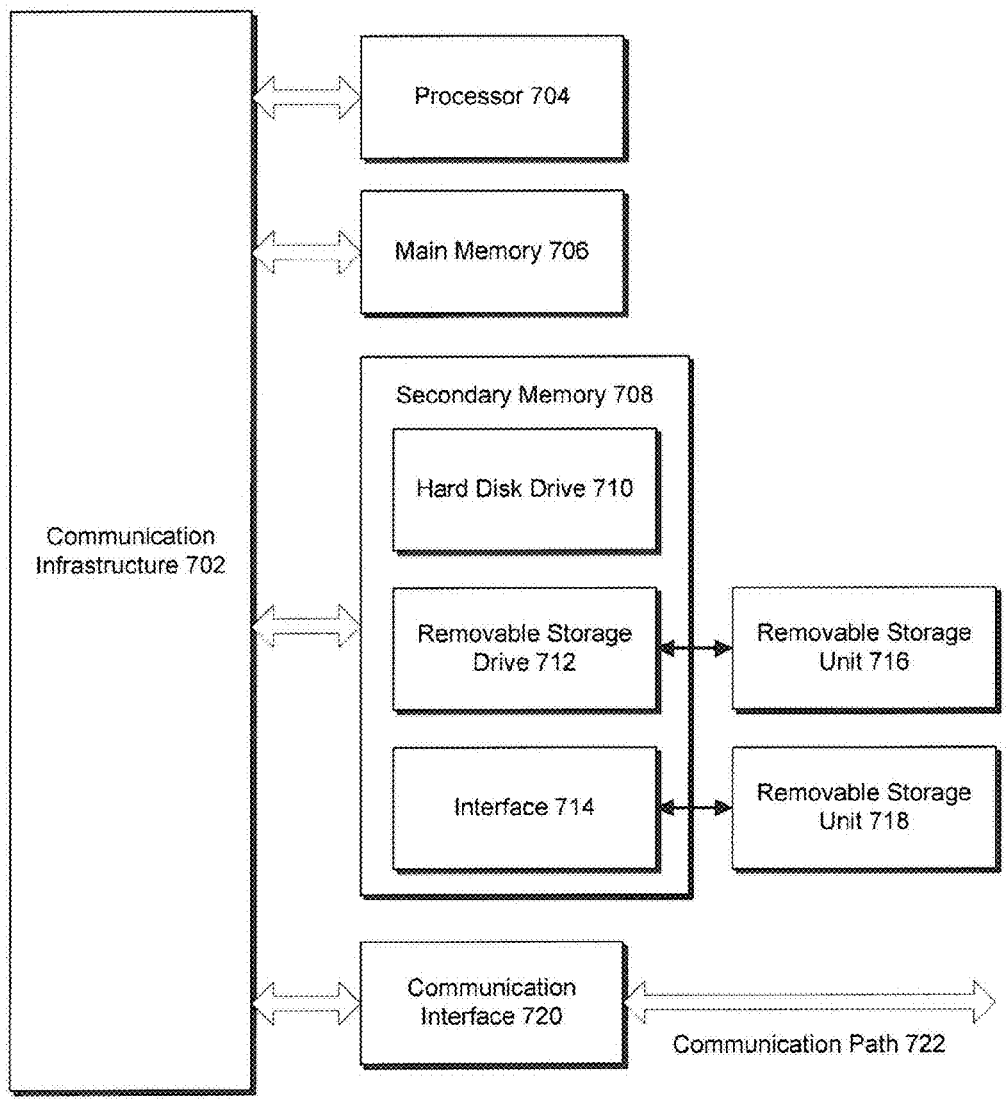
FIG. 7 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. Modules depicted in FIG. 4 may execute on one or more computer systems 700. Furthermore, each of the steps of the method depicted in FIG. 6 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An upstream receiver, comprising:
   a down-converter configured to down-convert a plurality of sub-carriers to provide a plurality of baseband signals;
   a plurality of soft-output demappers configured to demap symbols received over the plurality of baseband signals into a plurality of log-likelihood ratios (LLRs);
   a plurality of low-density parity-check (LDPC) decoders configured to decode a plurality of codewords based on the plurality of LLRs; and
   a burst noise detector configured to process ones of the plurality of baseband signals corresponding to null sub-carriers in the plurality of sub-carriers in order to detect burst noise and adjust one or more of the plurality of LLRs based on the detected burst noise.

2. The upstream receiver of claim 1, wherein the one or more LLRs are decreased based on the detected burst noise.

3. The upstream receiver of claim 1, wherein the burst noise detector is further configured to control an upstream scheduler to prevent data from being transmitted upstream over the null sub-carriers in the plurality of sub-carriers.

4. The upstream receiver of claim 1, wherein the burst noise detector is further configured to control a channel estimator to ignore a pilot symbol used to estimate a channel based on the detected burst noise.

5. The upstream receiver of claim 4, wherein the pilot symbol was received over one of the plurality of sub-carriers effected by the detected burst noise.

6. The upstream receiver of claim 1, wherein the burst noise detector is further configured to prevent a phase-offset correction to a clock, used to down-convert or sample at least one of the plurality of sub-carriers, based on information received over at least one of the plurality of sub-carriers effected by the detected burst noise.

7. The upstream receiver of claim 1, wherein the upstream receiver is implemented in a cable modem termination system and the plurality of sub-carriers are received from a plurality of cable modems.

8. The upstream receiver of claim 7, wherein the null sub-carriers in the plurality of sub-carriers are positioned between minislots.

9. An upstream receiver, comprising:
   a down-converter configured to down-convert a plurality of sub-carriers to provide a plurality of baseband signals; and
   a burst noise detector configured to process ones of the plurality of baseband signals corresponding to null sub-carriers in the plurality of sub-carriers to detect burst noise and adjust the upstream receiver based on the detected burst noise,
   wherein the burst noise detector is configured to control an upstream scheduler to prevent data from being transmitted upstream over the null sub-carriers in the plurality of sub-carriers.

10. The upstream receiver of claim 9, wherein the burst noise detector is configured to adjust the upstream receiver based on the detected burst noise by adjusting a log-likelihood ratio used by a low-density parity-check decoder configured to decode a codeword received over one of the plurality of sub-carriers.

11. The upstream receiver of claim 9, wherein the burst noise detector is configured to adjust the upstream receiver based on the detected burst noise by controlling a channel estimator to ignore a pilot symbol used to estimate a channel based on the detected burst noise.

12. The upstream receiver of claim 11, wherein the pilot symbol was received over one of the plurality of sub-carriers effected by the detected burst noise.

13. The upstream receiver of claim 9, wherein the burst noise detector is configured to adjust the upstream receiver based on the detected burst noise by preventing a phase-offset correction to a clock, used to down-convert or sample at least one of the plurality of sub-carriers, based on information received over at least one of the plurality of sub-carriers effected by the detected burst noise.

14. The upstream receiver of claim 9, wherein the upstream receiver is implemented in a cable modem termination system and the plurality of sub-carriers are received from a plurality of cable modems.

15. The upstream receiver of claim 14, wherein the null sub-carriers in the plurality of sub-carriers are positioned between minislots.

16. The upstream receiver of claim 9, wherein the plurality of sub-carriers are orthogonal to each other in frequency.

17. A method, comprising:
   down-converting a plurality of sub-carriers received by an upstream receiver to provide a plurality of baseband signals;
   determining null sub-carriers in the plurality of sub-carriers;
   processing ones of the plurality of baseband signals corresponding to the nulled ones of the plurality of sub-carriers to detect a burst noise; and
   adjusting the upstream receiver based on the detected burst noise, wherein adjusting the upstream receiver based on the detected burst noise comprises adjusting a log-likelihood ratio used by a low-density parity-check decoder configured to decode a codeword received over one of the plurality of sub-carriers.

18. The method of claim 17, wherein adjusting the log-likelihood ratio used by the low-density parity-check decoder configured to decode the codeword received over one of the plurality of sub-carriers comprises:

decreasing the log-likelihood ratio based on the detected burst noise.

19. A method, comprising:

down-converting a plurality of sub-carriers received by an upstream receiver to provide a plurality of baseband signals:

determining null sub-carriers in the plurality of sub-carriers;

processing ones of the plurality of baseband signals corresponding to the nulled ones of the plurality of sub-carriers to detect a burst noise; and adjusting the upstream receiver based on the detected burst noise, wherein adjusting the upstream receiver based on the detected burst noise comprises controlling a channel estimator ignore a pilot symbol used to estimate a channel based on the detected burst noise.

20. A method, comprising:

down-converting a plurality of sub-carriers received by an upstream receiver to provide a plurality of baseband signals;

determining null sub-carriers in the plurality of sub-carriers;

processing ones of the plurality of baseband signals corresponding to the nulled ones of the plurality of sub-carriers to detect a burst noise; and adjusting the upstream receiver based on the detected burst noise, wherein adjusting the upstream receiver based on the detected burst noise comprises preventing a phase-offset correction to a clock used to down-convert or sample at least one of the plurality of sub-carriers based on information received over at least one of the plurality of sub-carriers effected by the detected burst noise.

* * * * *

UNITED STATES PATENT AND TRADEMARK OFFICE
CERTIFICATE OF CORRECTION

PATENT NO. : 9,548,836 B2  
APPLICATION NO. : 14/137345  
DATED : January 17, 2017  
INVENTOR(S) : Ohana et al.

Page 1 of 1

It is certified that error appears in the above-identified patent and that said Letters Patent is hereby corrected as shown below:

In the Claims

Column 13, Line 16 replace "a channel estimator ignore a pilot symbol" with -- "a channel estimator to ignore a pilot symbol" --

Signed and Sealed this  
Fourth Day of June, 2019

Andrei Iancu  
*Director of the United States Patent and Trademark Office*